United States Patent
Naffati

(10) Patent No.: US 10,958,709 B2
(45) Date of Patent: Mar. 23, 2021

(54) METHOD FOR TRANSFERRING A FILE BETWEEN A CONTROL DEVICE OF A MOTOR VEHICLE AND A SERVER DEVICE OUTSIDE THE VEHICLE, CONTROL DEVICE AND MOTOR VEHICLE

(71) Applicant: Audi AG, Ingolstadt (DE)

(72) Inventor: Malek Naffati, Buxheim (DE)

(73) Assignee: Audi AG, Ingolstadt (DE)

( * ) Notice: Subject to any disclaimer, the term of this patent is extended or adjusted under 35 U.S.C. 154(b) by 162 days.

(21) Appl. No.: 16/322,734

(22) PCT Filed: Jul. 20, 2017

(86) PCT No.: PCT/EP2017/068368
§ 371 (c)(1),
(2) Date: Feb. 1, 2019

(87) PCT Pub. No.: WO2018/028967
PCT Pub. Date: Feb. 15, 2018

(65) Prior Publication Data
US 2020/0045099 A1   Feb. 6, 2020

(30) Foreign Application Priority Data

Aug. 8, 2016   (DE) .................... 10 2016 214 671.8

(51) Int. Cl.
*H04L 29/08*  (2006.01)
*G06F 11/10*  (2006.01)
*G06F 15/173* (2006.01)

(52) U.S. Cl.
CPC .......... *H04L 67/06* (2013.01); *G06F 11/1004* (2013.01); *H04L 67/02* (2013.01);
(Continued)

(58) Field of Classification Search
USPC ................. 709/219, 230–239, 223, 221, 224
See application file for complete search history.

(56) References Cited

U.S. PATENT DOCUMENTS 7,502,353 B2   3/2009  Bolz
9,195,666 B2   11/2015 Horn et al.
(Continued)

FOREIGN PATENT DOCUMENTS

CN   101930375 A   12/2010
CN   104160397 A   11/2014
(Continued)

OTHER PUBLICATIONS

International Preliminary Report on Patentability directed to related International Patent Application No. PCT/EP2017/068368, dated Sep. 14, 2018, with attached English language translation; 16 pages.
(Continued)

*Primary Examiner* — Jude Jean Gilles
(74) *Attorney, Agent, or Firm* — Sterne, Kessler, Goldstein & Fox P.L.L.C.

(57) ABSTRACT

The present application relates to a method for transferring a file between a control device in a motor vehicle and a vehicle-external server device, the control device in the motor vehicle being connected to a communication device via a data network, which for the transfer of the file provides a radio link to the server device and which caches data of the file during the transfer. The invention provides that the file is divided into a plurality of file segments and a segment identifier is determined for each file segment, the segment identifiers are transferred via the radio link before the file is transferred, the file segments are individually requested independently of each other by a respective request command via the radio link, the request command including the segment identifier of the requested file segment, and then each requested file segment being transferred independently of the remaining file segments.

10 Claims, 3 Drawing Sheets

Figure 1:
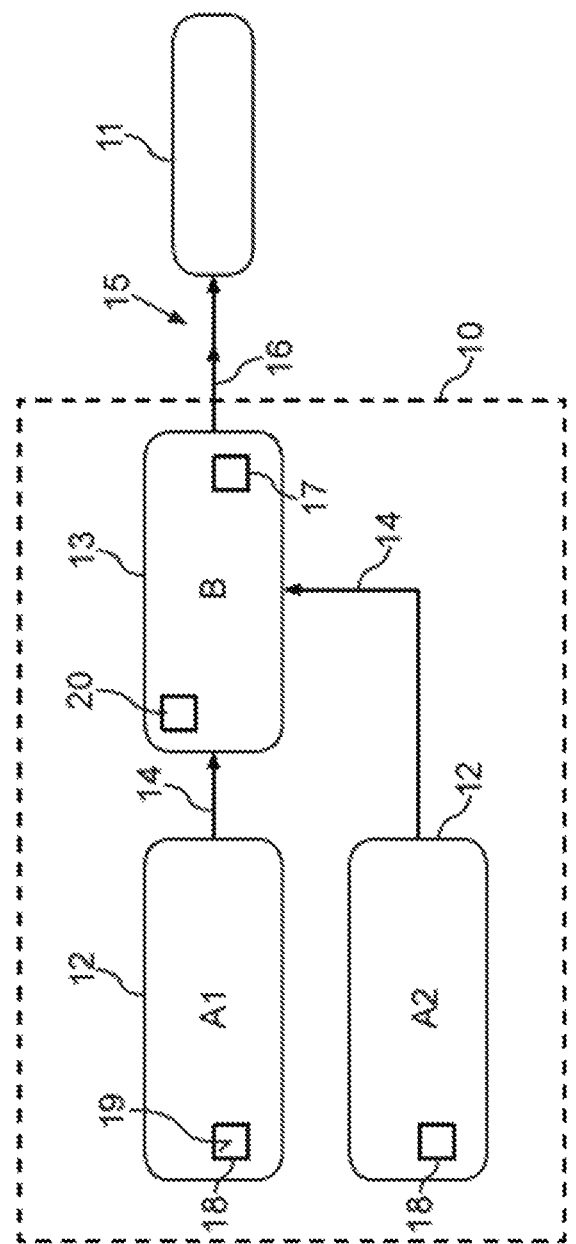

(52) U.S. Cl.
CPC ...... *H04L 67/1078* (2013.01); *H04L 67/2842* (2013.01); *H04L 69/329* (2013.01)

(56) References Cited

U.S. PATENT DOCUMENTS

| | | | |
|---|---|---|---|
| 9,596,281 | B2 | 3/2017 | Luby et al. |
| 2003/0187910 | A1* | 10/2003 | Furukawa ............. G06Q 10/06 718/104 |
| 2010/0293142 | A1 | 11/2010 | Ackerman et al. |
| 2012/0207040 | A1* | 8/2012 | Comsa ............. H04W 72/1215 370/252 |
| 2012/0233293 | A1 | 9/2012 | Barton et al. |
| 2013/0063456 | A1* | 3/2013 | Blanco ...................... G06T 1/60 345/530 |
| 2013/0103786 | A1 | 4/2013 | Migiore |
| 2015/0043491 | A1* | 2/2015 | Eng ........................ H04W 4/06 370/329 |
| 2015/0334769 | A1* | 11/2015 | Kim ...................... H04W 76/15 370/329 |
| 2017/0019346 | A1* | 1/2017 | Hayama .................. H04L 67/18 |
| 2017/0318458 | A1* | 11/2017 | Laselva ................. H04L 9/0891 |

FOREIGN PATENT DOCUMENTS

| | | |
|---|---|---|
| CN | 104865953 A | 8/2015 |
| CN | 106134147 A | 11/2016 |
| DE | 10237715 A1 | 2/2004 |
| DE | 102012020637 B3 | 10/2013 |
| DE | 102013016554 A1 | 4/2015 |
| WO | WO-2010125230 A1 | 11/2010 |

OTHER PUBLICATIONS

International Search Report and Written Opinion of the International Searching Authority directed to related International Patent Application No. PCT/EP2017/068368, dated Sep. 29, 2017, with attached English-language translation; 23 pages.

* cited by examiner

METHOD FOR TRANSFERRING A FILE BETWEEN A CONTROL DEVICE OF A MOTOR VEHICLE AND A SERVER DEVICE OUTSIDE THE VEHICLE, CONTROL DEVICE AND MOTOR VEHICLE

TECHNICAL FIELD

The present application relates to a method for transferring a file between a control device of a motor vehicle and a vehicle-external server device, which may be, for example, a server of the Internet. In addition, the control device for the motor vehicle and a motor vehicle, which is set up to carry out the method is also disclosed.

BACKGROUND

The transmission of data from a control device of a motor vehicle to a vehicle-external server device is possible if the control device itself has a radio modem or can send out the data indirectly via a communication device of the motor vehicle, which then has to provide the radio modem. In order to save costs, usually only one radio modem is provided in a central communication device, which may be connected to the control devices via a data network. Due to the limited transmission rate of the data network of the motor vehicle, correspondingly the transmission bandwidth for transmitting data to the server device is also limited. In addition, the data to be transmitted in the communication device must be cached. This results in particular in a problem when a control unit is to send contiguous data that are relatively extensive. This may be the case for contiguous data in the form of a file describing, for example, a camera image of a driver assistance system or a parameter set of an environment model or an artificial neuronal network of the driver assistance system. Then, the file must first be transferred to the communication device, which must cache the file in order to control the transfer process to the server device regardless of a capacity utilization of the data network.

The coupling of control devices with a vehicle-external server device via a communication device is known, for example, from DE 10 2013 016 554 A1. Therein is provided in the manner described that the communication device first collects data locally in a memory and subsequently carries out the transmission to the vehicle-external server device.

A vehicle communication architecture having a plurality of control units, which are coupled to a communication device via a data network, is also known from DE 102 37 715 A1. It is therein described that data contents of the motor vehicle can be actively accessed even from a vehicle-external server device.

The active collection or request of data from a plurality of control devices by an electronic device in a motor vehicle is known from DE 10 2012 020 637 B3.

BRIEF DESCRIPTION OF THE DRAWINGS/FIGURES

Figure 2:
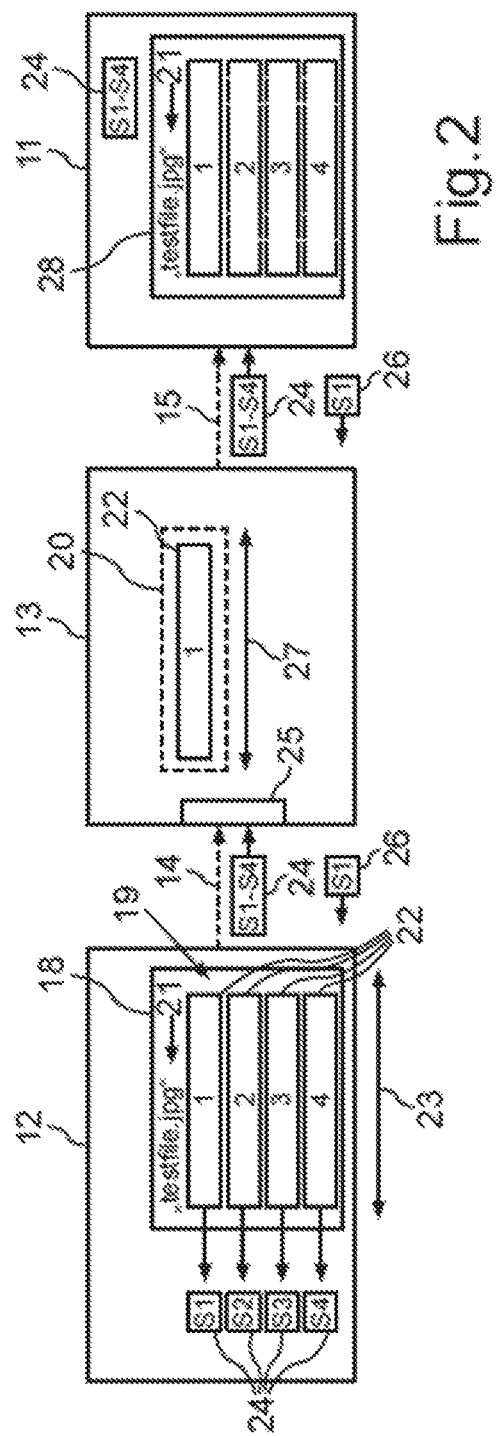
Figure 3:
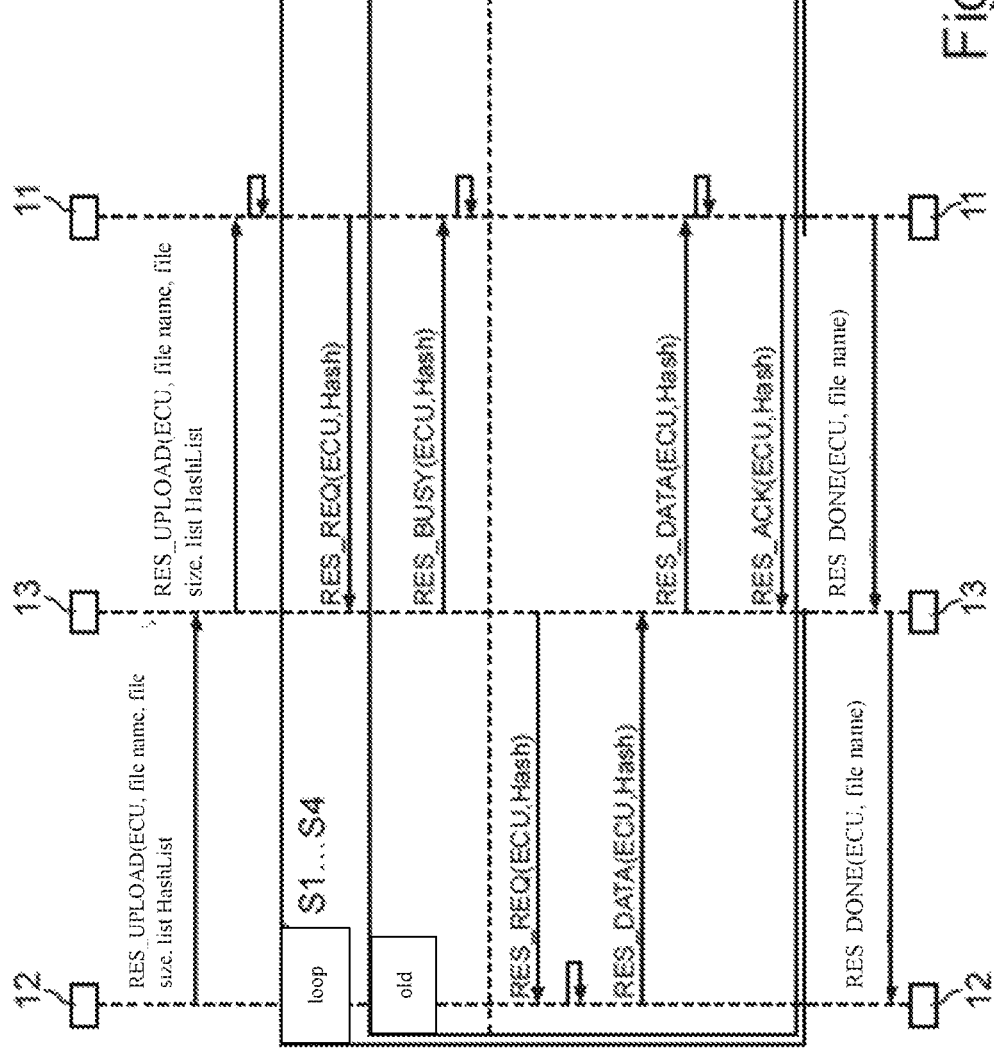

FIG. 1 is a schematic view of a motor vehicle, in accordance with some embodiments.
FIG. 2 is a diagram of a method, in accordance with some embodiments.
FIG. 3 is a diagram to illustrate an implementation of the method, in accordance with some embodiments.

DETAILED DESCRIPTION

The object of the present application is, when transferring large files between a control device of a motor vehicle and a vehicle-external server device, to keep the utilization of memory resources and transmission capacities of the communication link to a minimum.

The object of the present application is achieved by the subject-matter of the independent claims. Advantageous further refinements of the present invention are described by the dependent claims, the following description and the figures.

In accordance with some embodiments, a method for transferring a file between a control device of a motor vehicle and a vehicle-external server device is disclosed. The control device may be a control device of the motor vehicle. The vehicle-external server device may be, for example, a server device of the Internet. It can be configured, for example, as a computer or as a computer network. The file may include, for example, a camera image or an artificial neural network data set, or an environment model. In particular, the file can be larger than 500 kilobytes, in particular larger than one megabyte, in particular larger than 10 megabytes. Within the motor vehicle, the control device is connected via a data network to a communication device of the motor vehicle. The communication device may be another control device of the motor vehicle. The data network can be, for example, an Ethernet network or a CAN bus (Controller Area Network) of the motor vehicle. The communication device provides a radio link to the server device, the radio link being used to transfer the file. For this purpose, the communication device can have a radio modem, for example, a mobile radio module (for example LTE, UMTS or GSM) and/or a WLAN radio module (WLAN—Wireless local area network). To transfer the file, the communication device must cache data of the file during transmission.

In accordance with some embodiments, in order to not have to design the internal memory of the communication device in terms of its storage capacity of such magnitude that the entire file can be stored, and/or to not block the data network and the radio link for a longer, continuous period of time, the following is provided. It is assumed that the transfer of the file is a transfer either from the control device to the server device or from the server device to the control device. The method thus works for a transfer in the two possible directions.

The file is divided into a plurality of file segments. This is performed by the sending component, i.e. the control device or the server device. For each file segment, a respective segment identifier is determined. The segment identifier is unique for each of the file segments. Before transferring the file itself, the segment identifiers are transmitted via the radio link. Thus, the receiving component, i.e. the server device or the control device, recognizes or knows the segment identifiers. The file segments are then each independently requested individually via the radio link by a respective request command. The sending component thus receives a request command indicating which file segment is to be transferred. The request command includes the segment identifier of the requested file segment. Each requested file segment is transferred independently of the other file segments.

The method disclosed hereby in accordance with some embodiments, has the advantage that, for the communication connection between the control device and the server device, there is at a no time a need to have the entire file closed or transferred in a continuous transmission process. The transfer relates respectively to only one of the file segments, the segment sizes of which can be adjusted according to the available resources.

Further refinements in accordance with some embodiments are disclosed, which provide additional advantages.

Thus, in accordance with some embodiments, the mentioned segment size of the file segments can be set as function of a buffer size of a data buffer, in which the communication device temporarily stores the data of the file. Thus, as a function of the available resources "buffer size," the segment size is determined. In so doing, the data buffer is reliably prevented from being overloaded.

In accordance with some embodiments, the segment identifier is generated by determining a checksum value or a hash value. In other words, the segment identifiers simultaneously represent a check sum list. Thus, the segment identifier can also be used to check whether a file segment has been transferred without error. An example of a suitable checksum is the cyclic redundancy check (CRC). A hash value can also be used to uniquely identify a file segment. In general, it is thus provided that the segment identifier is a function of the data of the file included in the file segment.

Additionally or alternatively, it can be provided that each segment identifier also indicates a relative position of the associated file segment in the file. Thus, the order of the file segments can be reconstructed based on their segment identifiers. For example, to indicate the relative position, an ordinal number (first file segment, second file segment . . . ) or an offset, for example a byte offset, may be indicated as an offset within the file. Alternatively, it can be provided that the relative position of the file segments in relation to one another is implicitly defined or described by an order in which the segment identifiers of the file segments are transferred via the radio link. Thus, no additional memory is needed to indicate the relative position.

In accordance with some embodiments, a request command can be used advantageously for controlling a utilization of the data network, the communication device and/or the radio link. For this purpose, it is then provided that the request command is blocked or discarded (deleted) by the communication device if a utilization of the radio link and/or the data network and/or the communication device fulfills a predetermined overload criterion. The load criterion may for example mean that within a predetermined time period a predetermined maximum amount of data of the file has been transmitted. The overload criterion may additionally or alternatively indicate that a predetermined number of additional request commands or transmission attempts for transmitting other data are present in the communication device or have been received by the communication device.

In accordance with some embodiments, the segment identifiers and later the request command are each transmitted together with a device identifier of the control device. The segment identifiers and the request command are thus assigned to the control device by specifying the device identifier. The communication device accordingly controls a forwarding of a request command received via the radio link (control device sent file to server device) into the data network as a function of the device identifier included in the request command. This advantageously enables that the server device can request file segments from different control devices sequentially or alternately. Each request command identifies the control device which is next to send a file segment.

In accordance with some embodiments, in order to be able to reconstruct the file from the file segments in the receiving component, a file name and a file size are additionally transferred by the sending component, then an empty destination file having the file size is generated in the receiving component, and each received file segment according to its relative position or position in the file to be transferred is written into the destination file in the correct position or stored in the destination file. If the Internet Protocol (IP) is used, a direct connection between the control device and the server device in the sense of a peer-to-peer connection is usually necessary. The communication device then acts as a router or gateway. In accordance with some embodiments, the peer-to-peer connection connects the communication device and the server device via the radio link, that is, the peer-to-peer connection is provided by the communication device and the server device, so that the peer-to-peer connection terminates at the communication device in the motor vehicle on the one hand and in the server device on the other hand. In order to transmit the data of the file between the control device and the communication device vehicle-internally, it is then provided that the communication device in the data network for the control device provides the transfer of the file as a network service different from the peer-to-peer connection. The control device can thus, for example, exchange the file segments with the communication device (sending or receiving) on the basis of an inter process communication (IPC). Thus, the data network remains separate or isolated from a vehicle-external communication link as provided by the peer-to-peer connection. Thus, the data network is separated from, for example, the Internet and/or a mobile network.

In accordance with some embodiments, a control device for the motor vehicle is disclosed. For sending out a file via a communication device of the motor vehicle to a vehicle-external server device, the control device is set up to first divide the file into a plurality of file segments, to determine a respective segment identifier for each file segment, to send out the segment identifiers via the communication device to the server device before sending the file, to receive for each of the file segments, independently of the remaining file segments, via the communication device a respective request command, which includes the segment identifier of the respective requested file segment, from the server device, and to send out each requested file segment independently of other file segments. The control device can thus be operated as a sending component in the method described.

Further a person having skilled in the art may arrive at the refinements of the control device, which have features as already described in connection with the further refinements of the method above. For this reason, the corresponding further refinements of the control device are not described again.

In accordance with some embodiments, a motor vehicle, which has at least one control device representing one embodiment of the control device as described herein is disclosed. The at least one control device is connected to a communication device of the motor vehicle via a data network of the motor vehicle. The communication device is configured to provide a connection via a radio link to a vehicle-external server device. Overall, the motor vehicle is set up to carry out an embodiment of the method according to the present invention.

In the following, various embodiments are described with reference to the drawings.

The exemplary embodiment is subsequently described with reference to drawings. In the exemplary embodiment, the described components of the embodiment each represent individual features, which are to be considered independently of each other, which also are to be regarded individually or in a different combination than the one shown herein. Furthermore, the described embodiment can also be supplemented by further features in accordance with embodiments, which have been already described.

In the figures, functionally identical elements are each provided with the same reference numerals.

FIG. 1 is a schematic view of a motor vehicle, in accordance with some embodiments. In FIG. 1, a motor vehicle 10 and a server device 11 are shown. Motor vehicle 10 may be, for example, a motor vehicle, in particular a passenger car. Server device 11 may, for example, be provided by a server of the Internet. Server device 11 may include a computer or a computer network for this purpose.

Motor vehicle 10 may have one or a plurality of control devices 12 and a communication device 13. For example, a control device 12 may be configured to provide driver assistance functionality. A control device 12 may include, for example, a camera or another sensor. Each control device 12 may be connected to communication device 13 via a data network 14. Data network 14 may be based on an Ethernet and/or CAN and/or MOST (Media Oriented Systems Transport) bus and/or FlexRay bus. Communication device 13 may be connected to server device 11 via a further communication link 15, which may include a radio link 16, for example, to a mobile radio network (not shown) or to a WLAN router. Communication link 15 may be a peer-to-peer connection, for example a TCP/IP connection (TCP—transmission control protocol) or a UDP/IP connection (UDP—user datagram protocol). For providing radio link 16, communication device 13 may include a radio modem 17, for example a mobile radio module and/or a radio modem for WLAN. Communication device 13 can be configured, for example, as a gateway of data network 14 or as a further control device for motor vehicle 10.

Control device 12 may transmit data to server device 11, each of which may be summarized in a file 18 representing a data set of the data which belong together. For example, a file 18 may be an image file or an audio file or a data set for a model or an artificial neural network.

To transfer file 18 of a control device 12 to server device 11, each control device 12 uses radio link 16, which is provided by communication device 13. In other words, data 19 included in each file 18 have to be able to be cached in a data buffer 20 of communication device 13 in order to then be able to transmit the data via communication link 15 to server device 11. In this instance, however, data buffer 20 does not have to be as large as file 18, but the data buffer 20 may be smaller than file 18.

FIG. 2 is a diagram of a method, in accordance with some embodiments. FIG. 2 illustrates the transmission principle. In control device 12, file 18 is stored with a file name 21 (here "testfile.jpg" for example) and data 19. Data 19 may be divided into file segments 22, each of which may have a predetermined segment size 23. The classification can be purely logical or by dividing data 19 in a memory. The file segments are distinguished by name, here by reference characters S1 to S4. For each file segment 22, respectively one segment identifier 24 can be calculated, for example a hash value. Control device 12 may request the transmission of file 18 to the communication device 13 via an interprocess communication at a service interface 25, for example an IP (Internet Protocol)-socket. Service interface 25 provides access to a network service of communication device 13 in data network 14. Communication device 13 can then mediate the data transmission to server device 11 for requesting control device 12.

Control device 12 can transmit segment identifiers 24 via communication device 13 to server device 11, so that segment identifiers 24 are present in server device 11. This server device 11 can then individually request one of file segments 22 in that file segment 22 to be sent or to be transferred transfers the respective segment identifier as request command 26 via communication device 13 to server device 12. Control device 12 may thus transfer requested file segment 22 (In FIG. 2, file segment S1) independently of the other file segments 22 to communication device 13. Communication device 13 thus has to store only data of segment size 23 in its data buffer 20, so that a buffer size 27 corresponds to segment size 23. Now, cached file segment 22 can be transferred from data buffer 20 via communication link 15 to server device 11. Server device 11 for storing file segments 22 may generate an empty file 28 which, for example, may have the same file name 21 as file 18. Received file segments 22 may then be stored in empty file 28 in the correct order, such as may be described by segment identifiers 24, as it is illustrated in FIG. 2 for first file segment S1.

Then, with the aid of a further request command 26, next file segment 22 can be requested by specifying corresponding segment identifier 24, which can then be cached in the same data buffer 20 since the data of already successfully transferred file segment 22 is no longer needed in data buffer 20.

The segmented data transmission allows data to be routed via a control device having modem 17 (i.e., communication device 13 as a whole) to a server device 11 without having to provide resources for completely buffering data 19. These resources only have to be available on control device 12 from which data 19 is to be sent. Diverting controller 13 with modem 17 only has to coordinate the transmission between control units 12 and server device 11 and provide a small buffer (data buffer 20, cache). In this instance, the arbitration of the Internet connection is also taken over.

FIG. 3 is a diagram to illustrate an implementation of the method, in accordance with some embodiments.

In accordance with some embodiments, the object of communication device 13 is the coordination of the data transmissions initiated by control units 12 to server device 11. The implementation of this component takes into account, on the one hand, the limited memory resources of communication device 13 and the arbitration of the data transmission of control devices 12 to communication device 13, and of communication device 13 to server device 11.

Communication device 13 represents a configurable data collector ODC, which provides the said functions. Server device 11 represents a backend (rearward end).

A large file 18 to be sent on a control device 12 is first viewed in file segments 22. For each segment 22, a hash value is formed as a segment identifier 24 and is stored in a list HashList. Control device 12 sends the message RES_UPLOAD to the data collector (communication device 12), which in turn forwards this message to server device 11. Sent RES_UPLOAD message communicates to the backend that control device 12 wants to transfer a file 18 having file name 21 (Filename) and having file size Filelength. Furthermore, a list HashList of hashes for each file segment 22 is sent in the message. In addition, a device identifier ECU can identify control device 12.

The message RES_UPLOAD received by backend 11 results in file 28 being created. Backend 11 will now send a RES_REQ message to communication device 13 for each hash in HashList (loop S1 . . . S4). This RES_REQ message includes device identifier ECU by which communication device 13 can forward the message to the correct control device. The RES_REQ message is the request from the backend service to a control device 12 to send a particular file segment 22 identified by a hash.

On receipt of the RES_REQ message, control device 12 sends a RES_DATA message which, in addition to device identifier ECU and segment identifier Hash, includes actual file segment 22 for the purpose of identification. The message is cached in communication device 13 and forwarded to backend 11. This uses the HashList to also reconstruct and store requested file segments 22 in the correct order.

If a RES_REQ message is sent from the backend to the communication device while another data transfer is taking place (old), this request is answered with RES_BUSY. The backend service must request this file segment again at a later time.

Once all file segments have been requested and received by the vehicle, the upload of the file is completed by the message RES_DONE. The communication device clears its temporary memory (cache); control device 12 deletes file 18 if it is no longer needed.

Segment size 23 of transferred file segments 22 is determined by control device 12. The segmenting of the data into different segment sizes results in a varying number of file segments and hashes in the HashList. Only the resources needed for caching on the ODC should be considered as a restriction.

Overall, the example shows how, the control devices can perform a file upload with the aid of a configurable data collector.

What is claimed is:

1. A method, comprising:
dividing, at a control device located in a motor vehicle, a file into a plurality of file segments;
adjusting, at the control device, a segment size of the plurality of file segments in response to a change in a buffer size of a data buffer, wherein the data buffer is used to cache data of the file at a communication device;
determining, at the control device, a file segment identifier for each file segment of the plurality of file segments;
transferring, via a radio link between the control device and a server device, the file segment identifier for each of the plurality of file segments, wherein the server device is located external to the motor vehicle;
receiving, at the control device, a request command for transfer of a requested file segment of the plurality of file segments; and
in response to the received request command, transferring, from the control device to the server device, the requested file segment,
wherein the radio link is provided by the communication device,
wherein the communication device is communicatively coupled with the control device via a data network, and
wherein the received request command comprises the file segment identifier of the requested file segment.

2. The method of claim 1, wherein the determining the file segment identifier includes determining a checksum value or a hash value of the file segment of the plurality of file segments.

3. The method of claim 1, further comprising:
determining a relative position of the file segment based on the file segment identifier or an order of transmission of the file segment identifier over the radio link.

4. The method of claim 1, further comprising:
rejecting, at the communication device, the received request command based on a predetermined overload criterion for a utilization of the radio link, the data network, or the communication device; and
blocking, at the communication device, the received request command based on the predetermined overload criterion for the utilization of the radio link, the data network, or the communication device,
wherein the predetermined criterion comprises one of:
exceeding a predetermined amount of data transmitted over the radio link,
exceeding a predetermined number of request commands, and
exceeding a predetermined number of attempts for transmitting or receiving data at the communication device.

5. The method of claim 1, further comprising:
transmitting, from the control device, a device identifier of the control device with the file segment identifier; and
controlling, at the communication device, forwarding of the received request command via the radio link to the control device based on the device identifier of the control device,
wherein the received request command further comprises the device identifier of the control device.

6. The method of claim 3, further comprising:
transmitting, from the control device, a file name and a file size;
generating, at the control device, an empty destination file having the file size; and
writing, at the control device, the each file segment corresponding to the relative position of the file segment into the file to be transferred.

7. The method of claim 1, further comprising:
establishing the radio link between the communication device and the server device as a peer-to-peer connection; and
transferring, from the communication device to the control device via the data network, the file as a network service,
wherein the network service is different from the peer-to-peer connection for the control device.

8. A control device for a motor vehicle, the control device being configured to:
divide a file into a plurality of file segments;
adjust a segment size of the plurality of file segments in response to a change in a buffer size of a data buffer, wherein the data buffer is used to cache data of the file at a communication device;
determine a file segment identifier for each file segment of the plurality of file segments;
transfer, via a radio link between the control device and a server device, the file segment identifier for each of the plurality of file segments, wherein the server device is located external to the motor vehicle;
receive a request command for transfer of a file segment of the plurality of file segments; and
in response to the received request command, transfer the requested file segment to the server device,
wherein the radio link is provided by the communication device,
wherein the control device and the communication device are located in the motor vehicle,
wherein the communication device is communicatively coupled with the control device via a data network, and
wherein the received request command comprises the file segment identifier of the requested file segment.

9. A server device configured to:
divide a file into a plurality of file segments;
adjust a segment size of the plurality of file segments in response to a change in a buffer size of a data buffer, wherein the data buffer is used to cache data of the file at a communication device;
determine a respective file segment identifier for each file segment of the plurality of file segments;
transfer, via a radio link between a control device and the server device, the respective file segment identifier for each of the plurality of file segments;
receive a request command for transfer of a file segment of the plurality of file segments; and
in response to the received request command, transfer the requested file segment to the control device,
wherein the radio link is provided by the communication device,
wherein the control device and the communication device are located in a motor vehicle,
wherein the server device is located external to the motor vehicle,
wherein the communication device is communicatively coupled with the control device via a data network, and
wherein the received request command comprises the file segment identifier of the requested file segment.

10. A motor vehicle comprising:
at least one control device; and
a communication device,
wherein the at least one control device is communicatively coupled to the communication device via a data network of the motor vehicle,
wherein the communication device is configured to provide a radio link to a server device, wherein the server device is external to the motor vehicle, and
wherein the at least one control device is configured to:
    divide a file into a plurality of file segments,
    adjust a segment size of the plurality of file segments in response to a change in a buffer size of a data buffer, wherein the data buffer is used to cache data of the file at the communication device,
    determine a respective file segment identifier for each file segment of the plurality of file segments,
    transfer, via the radio link to the server device, the respective file segment identifier for each of the plurality of file segments,
    receive a request command for transfer of a requested file segment of the plurality of file segments, and
    in response to the received request command, transfer the requested file segment to the at least one control device,
wherein the received request command comprises the file segment identifier of the requested file segment.

* * * * *